United States Patent Office 3,445,768
Patented May 20, 1969

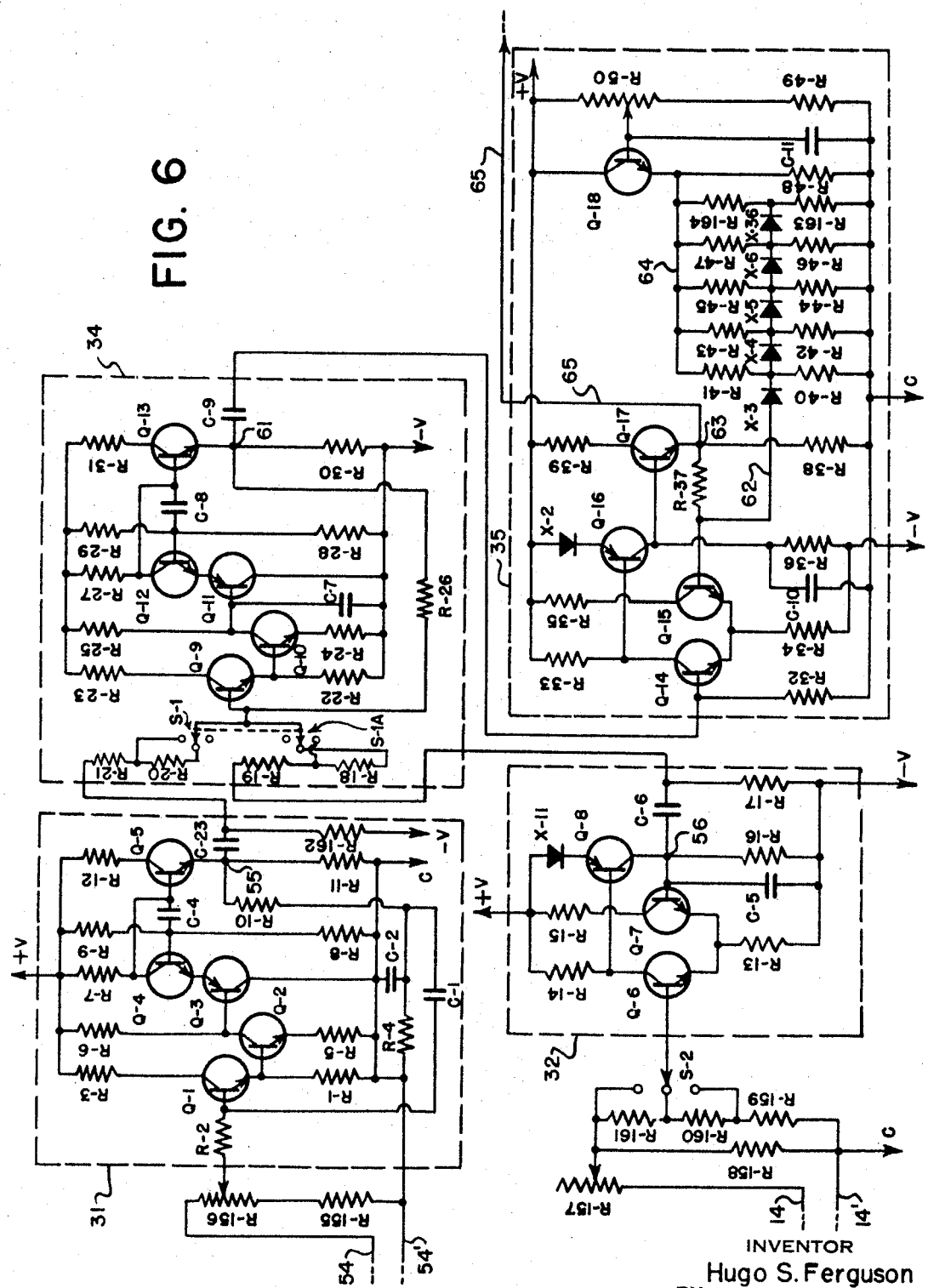

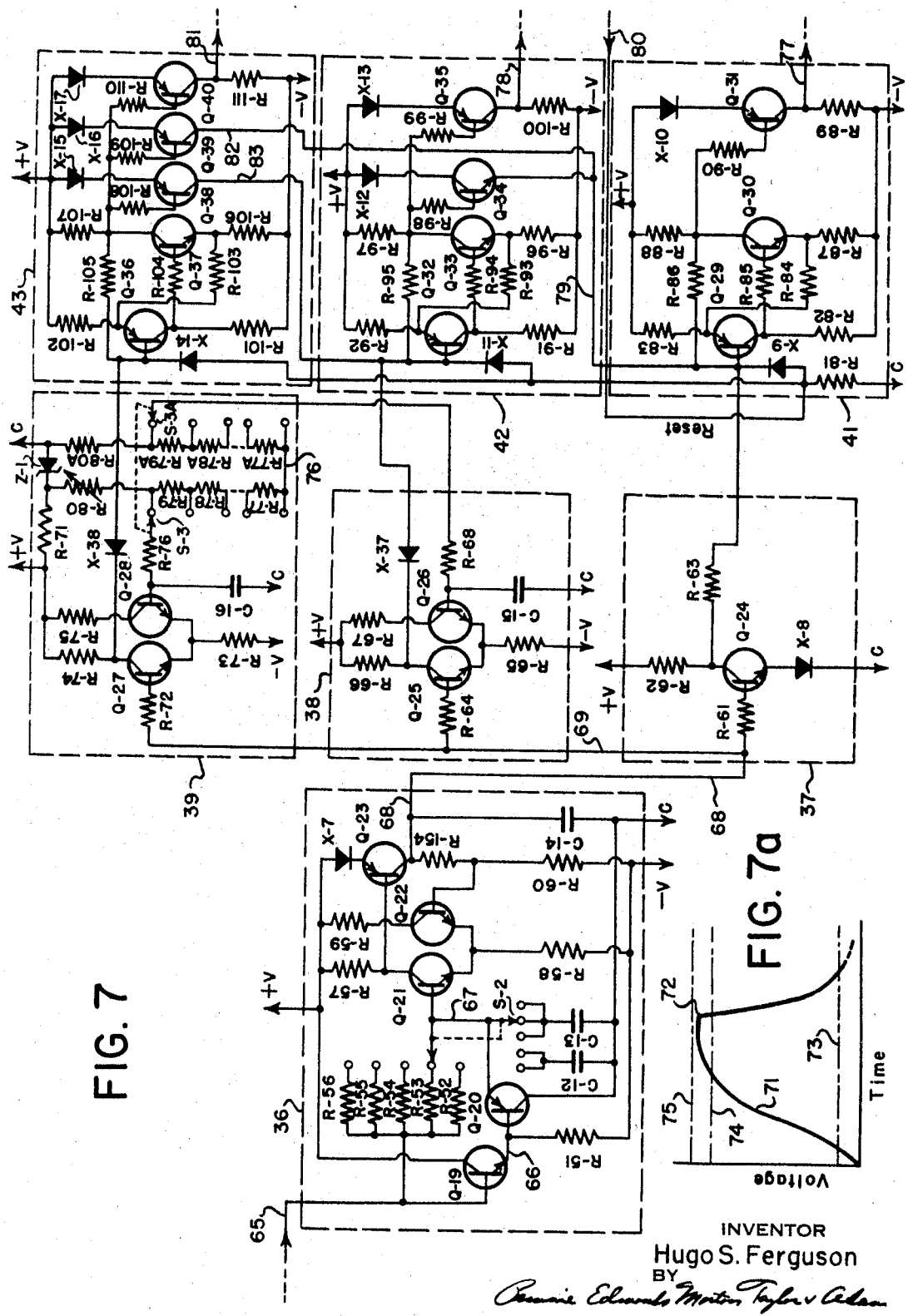

3,445,768
POWER MONITOR, PARTICULARLY FOR WELDERS, BASED ON QUARTER-SQUARES COMPUTATION PROCEDURE
Hugo S. Ferguson, Averill Park, N.Y., assignor to Duffers Associates, Inc., Wynantskill, N.Y., a corporation of New York
Filed Apr. 22, 1964, Ser. No. 361,740
Int. Cl. G01r 7/00, 11/32; B23k 9/10
U.S. Cl. 324—142    10 Claims

ABSTRACT OF THE DISCLOSURE

A power monitor, particularly for resistance welders, uses the relationship $v_p=(\tfrac{1}{2}v_i+\tfrac{1}{2}v_e)^2$. Input signals proportional to current and voltage are applied to a summing circuit and their amplitudes initially adjusted to equality. The sum is squared, and changes in the squared output from that corresponding to the initial values are detected. Preferably the squared signal is integrated until the integrated value equals the instantaneous value of the trailing edge of the signal, and selectable time constants are provided. Level detectors adjustable in opposite directions from predetermined levels are provided to facilitate establishing initial conditions and then a desired tolerance range.

---

This invention relates to apparatus for monitoring short bursts of electrical power, as in electric welders. It is particularly directed to the monitoring of power used in making resistance welds with a D-C welder of the capacitance-discharge, or in general stored energy-discharge type. However, it may be useful in other applications where similar types of voltage and current waveforms are encountered.

Relatively low power D-C welders of the capacitance-discharge type are now available for making metallic joints on a production line basis. An important use of such welders is in making connections in electronic circuits. A considerable number of parameters affect the quality of a weld, and one important parameter is the actual power supplied to the weld itself. This power is subject to considerable variation under production conditions, since small changes in the contact area of the wires or other parts being joined may markedly affect the load resistance and hence the power input to the weld. Any changes in the welder itself, operator error, etc. may also affect the quality of the weld.

Whether a good weld has been made is frequently difficult to ascertain by subsequent inspection or routine testing. Further, where reliability is important it is desirable to make sure that each and every weld has been made properly.

Accordingly it is desirable to monitor the power used in making the welds, so as to be sure that it stays within proper limits. This can be accomplished by measuring the instantaneous voltage and current during the course of the weld, and multiplying the two to obtain power. Although computers are available capable of performing this operation, in general they are far too complicated and expensive to permit use in ordinary production.

It is a primary object of the present invention to provide a power monitor which is sufficiently simple, reliable and low in cost to enable its use during production, while at the same time yielding sufficiently accurate indications.

Measurement of total power or energy used in making a weld may not suffice to insure a high quality weld. For good bonding, the rate of heating must be such that the temperature of the metals is caused to increase rapidly. Thus, the rate of power input, and the length of time the power is applied, are important. Depending upon the particular application, a very short, high peak power pulse may be ineffective, or a long, low peak power pulse may be ineffective. Accordingly, the monitor of the invention provides means for integrating the power for a time related to the pulse length and with a selectable time constant such that an effective energy or effective power measurement can be made. This will be explained further hereinafter.

The monitor of the present invention employs an analog-type computer for determining power which is based on the so-called "quarter-squares" method of computation. The quarter-squares relation may be expressed as:

$$v_p = \tfrac{1}{4}[(v_i+v_e)^2 - (v_i-v_e)^2] \qquad (1)$$

Here, $v_p$, $v_i$ and $v_e$ are voltages representing instantaneous power, current and voltage, respectively. By expanding the squared terms and performing the indicated addition and subtraction, the equation becomes simply $v_p = v_i v_e$.

In order to instrument Equation 1, a summing circuit may be employed to obtain $v_i+v_e$, and a squaring circuit then employed. An independent summing circuit may be employed to yield $v_i-v_e$, and the resultant fed to another squaring circuit. The difference between the square of the sum and the square of the difference is then obtained by another summing circuit. It will therefore be seen that several summing and squaring circuits are required. With proper instrumentation, power can be computed for all four quadrants involving plus and minus values of $v_i$ and $v_e$.

In a particular D-C welder setup, the polarities of the voltage and current waveforms are always the same. Thus, one can choose the voltage and current waveforms to be either positive or negative, so that a single quadrant computation suffices. This simplifies the computing apparatus somewhat, but there are still disadvantages in using the relationships of Equation 1.

With different welders, and with a given welder operating under different conditions, the magnitudes of the current and voltage waveforms may be expected to vary over a considerable range. In some circumstances the amplitudes may be nearly equal, and in others far from equal. Thus obtaining the sum and difference of the two quantities requires that the circuits be able to operate linearly over a wide range of signal levels all the way from the sum of two signals which may or may not be equal, to the difference between two signals which may be very nearly equal and therefore result in an extremely small signal. Squaring the resultant signals requires linearity over a still larger range, say, from 50:1 to perhaps as much as 100:1. Thus, the computer becomes difficult and expensive to design, taking into account the maintenance of stability over a long term.

In accordance with the present invention, input adjustments are provided and the current and voltage waveforms applied to the analog computer made substantially equal under the desired welding conditions, and only the first term in Equation 1 is employed. Thus, the computer of the present invention operates according to the equation:

$$v_p = \tfrac{1}{4}(v_i+v_e)^2 = (\tfrac{1}{2}v_i+\tfrac{1}{2}v_e)^2 \qquad (2)$$

When this is done the computer circuitry becomes much simpler. Only a single summing circuit and a single squaring circuit are required and, since $v_i$ and $v_e$ are initially equal, and may not depart very far from equality without impairing the weld, the range of operation is greatly reduced. At the same time, sufficient accuracy for the purpose is obtained. Consider, for example, that the current waveform exceeds the voltage waveform by 10%. The computation of the square of the sum in both Equations 1 and 2 will be the same. The difference term in Equation 1 will amount to only about 5% of the sum term and, when both are squared and subtracted, the error resulting from using Equation 2 will be only about 0.25%. A 20% difference in amplitude gives an error of about 1%.

There is some tolerance in energy while still yielding satisfactory welds. While the tolerances vary with the materials being welded, thickness of material, etc., variations of +10% to +15% are encountered in practice. In the initial setup the monitor may be adjusted for mean welding conditions and then set to indicate whenever the measurements fall outside the desired tolerance range for that particular setup. Since the tolerance is not likely to exceed 10 or 15% of the mean, and may be less, it will be seen that the error due to using Equation 2 will be insignificant.

In adjusting the inputs of the computer so that equal amplitude $v_i$ and $v_e$ waveforms are initially obtained, the unit of power resulting from the computation will vary. While the unit could be ascertained, it is ordinarily not necessary for production purposes. Commonly the monitor inputs will be adjusted under conditions resulting in a good weld. Then, only substantial departures from the initial conditions are required to be indicated.

One further factor may be mentioned, namely, phase angle. Computation in accordance with Equation 1 takes phase angle fully into account whereas Equation 2 takes it only partially into account since only one sum term is involved. For most commercial D-C welders of the capacitance-discharge type it has been found that only small phase angles are involved, commonly less than 10° in the inductive direction. Thus any error due to this factor is small. More important, in a given welder setup initial adjustment of the monitor under conditions resulting in a good weld takes into account the existing phase angle, and the phase angle for that set up may be expected to be quite constant under conditions yielding an acceptable weld.

The invention will be described in connection with a specific embodiment thereof in which further features and advantages will in part be pointed out and in part be understood by those skilled in the art.

In the drawings:

FIGS. 6, 7 and 8 are circuit diagrams corresponding to the block diagram of FIG. 5, and FIG. 7a illustrates the operation of FIG. 7.

Figure 1:
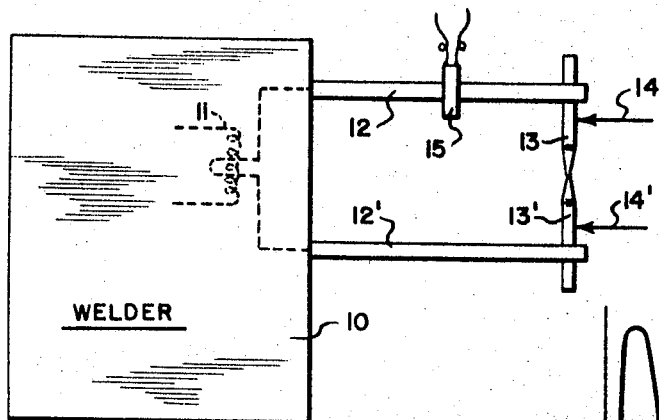
FIG. 1 illustrates a suitable manner of obtaining current and voltage signals from a welder.

Referring to FIG. 1, a welder 10 is shown having an output transformer 11 in phantom. Commonly welders supply current through a stepdown transformer having a single turn secondary winding, as shown. Heavy conductors or arms 12, 12′ carry electrodes 13, 13′ between which the wires or other metal objects to be welded (not shown) are positioned. Leads 14, 14′ are connected to the electrodes in order to obtain a voltage signal representing the voltage drop across the workpieces and the intervening portions of the electrodes. The voltage drop in the electrodes will be small compared to that in the weld. an air-core toroid coil encircles arm 12 so as to obtain a signal output representative of the current flowing through the workpieces.

Figure 2:
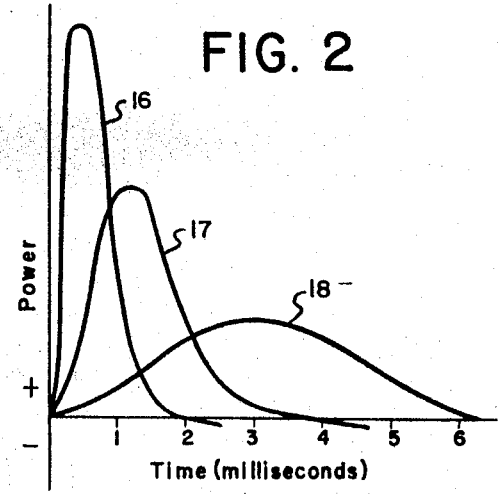
FIG. 2 illustrates several different pulse power waveforms which may be obtained in practice.

Referring to FIG. 2, waveforms 16, 17 and 18 show the variation in instantaneous power versus time under different conditions of operation. Waveform 16 shows a condition where a high peak power is applied, but the duration of the power pulse is relatively short. Waveform 17 shows a lower peak power but the power is applied for a longer time. Waveform 18 shows a still lower peak power and a still greater time.

The waveforms are drawn with approximately equal areas and therefore represent approximately equal amounts of total energy delivered to the workpieces. However, it is unlikely that all three waveforms would produce an acceptable weld of workpieces of the same size, shape, material, etc. It is likely that waveform 17 would be found superior to 16 or 18. In 16 the power is applied for too short a time and in 18 the amplitude is too low. The particular waveform which produces an acceptable weld under given conditions may be determined experimentally or from previously acquired knowledge, and will vary widely. Nevertheless, FIG. 2 illustrates that a mere measurement of total energy expended in making the weld is unlikely to be satisfactory.

Figure 3:
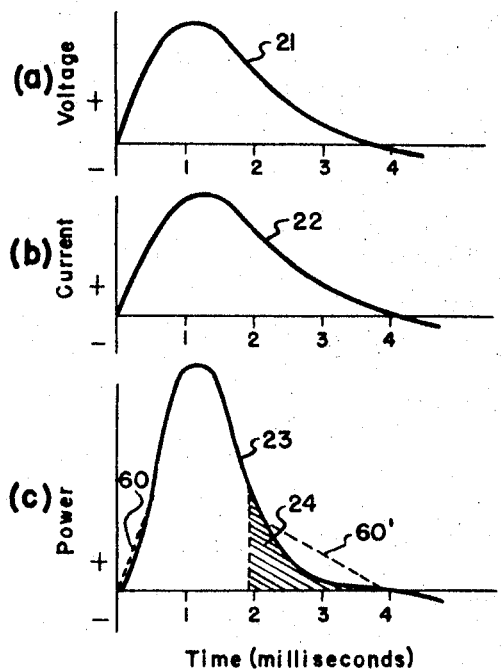
FIG. 3 shows illustrative current and voltage waveforms with a capacitance-discharge type D-C welder, and a corresponding power waveform.

Referring to FIG. 3, a voltage waveform 21 and a current waveform 22 are shown of the type likely to be encountered in practice with a capacitance-discharge type D-C welder. Waveforms 21 and 22 may have similar shapes, although they ordinarily will not be identical due to the variation in the resistance of the weld as it is made. The exact relationship will depend on many factors including the particular make of welder, the resistance in the transformer secondary and conductors which deliver current to the workpieces, etc. There may also be a difference in phase between the voltage and current waveforms. Commonly this is not very large, usually being less than 10°, and in a particular setup will be fairly constant. It will be noted that the trailing ends of the waveforms go somewhat negative. This is because of resonance in the secondary circuit of the transformer, which is likely to produce some overshoot.

Waveform 23 shows the instantaneous power resulting from multiplying the waveforms of 21 and 22. The energy represented by the hatched area 24 is not likely to be effective. If the weld has not been completed by the time this power level is reached, it is very doubtful that the added energy will do any good. A slight overshoot may occur at trailing end, but the power level at this point is so small that it would not contribute anything to the weld. Hence the hatched area 24 and the overshoot may be disregarded.

As illustrated in FIG. 2, the determination of effective energy used in making a weld must take into account time as well as power. This could also be stated as effective power, considering this to be energy measured for a predetermined length of time.

The present invention uses an integrating circuit to integrate the instantaneous power as a function of time and provides means for terminating the integration when the integrated signal and the instantaneous value of the trailing edge of the power waveform become equal. Provision is also made to change the time constant of the integration so as to take into account different operating conditions, particularly different power pulse lengths.

Figure 4:
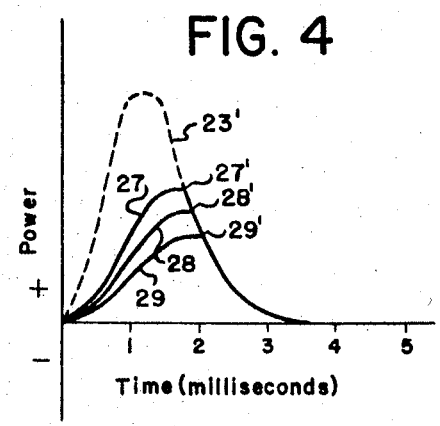
FIG. 4 illustrates the manner in which an effective power measurement is made in accordance with the invention.

Referring to FIG. 4, waveform 23′ is similar to 23 in FIG. 3. Full lines 27, 28 and 29 represent integrations with different time constants. It will be noted that all three of the integrated curves terminate on the trailing edge of waveform 23′. That is, integration is discontinued when the integrated value becomes equal to the instantaneous value on the trailing edge. This equality, therefore, establishes the upper limit of the integration.

As will be observed, the final integrated values at points 27′, 28′, 29′ are related to the duration of the power pulse 23′. If the power pulse were longer but of the same amplitude, the final integrated values would be higher, and vice versa. By proper selection of the time constant of integration, it has been found that a terminal value can be obtained which correlates very well with the acceptability of a weld. Generally it has been found that a terminal value of the order of 50% of the peak power is appropriate.

Figure 5:
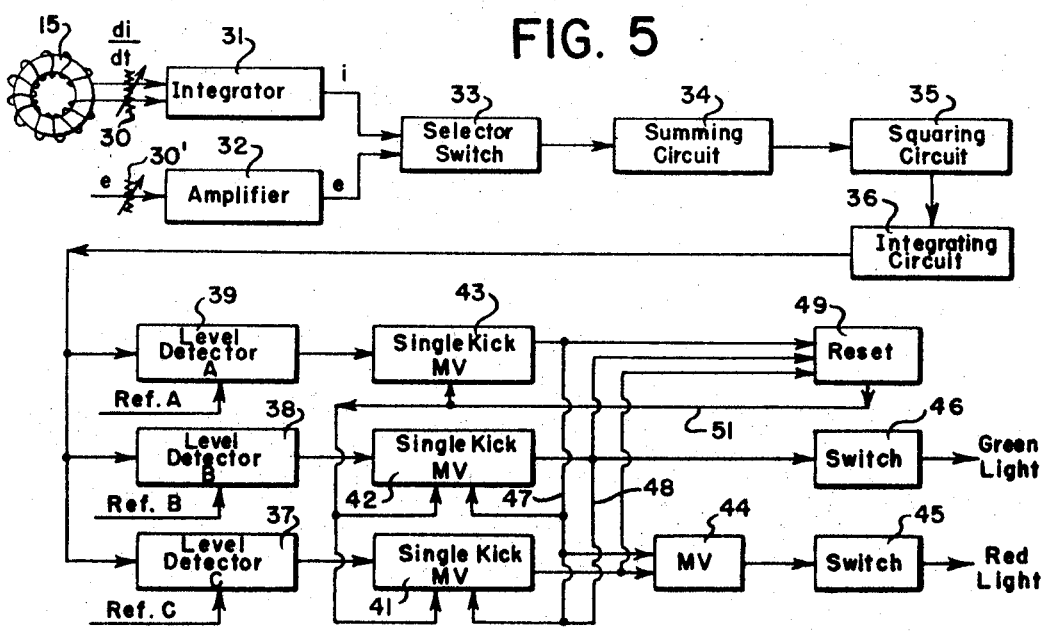
FIG. 5 is a block diagram of a monitor in accordance with the invention.

Referring now to FIG. 5, a block diagram of a monitor in accordance with the invention is illustrated. Air-core toroid 15 will yield an output proportional to the derivative of the current, and consequently the output is integrated in input circuit 31 to give a signal proportional to current, as indicated. If a different type of current pickup were used yielding an output proportional to current, integration would be unnecessary and 31 could be an impedance matching amplifier. The voltage signal $e$ obtained from leads 14, 14′ in FIG. 1 is supplied to an input impedance matching amplifier 32. The resultant instantaneous $i$ and $e$ signals are applied through a selector switch 33 to a summing circuit 34 and then to a squaring circuit 35. The purpose of the selector switch is to enable measuring current squared and voltage squared, as well as power. Gain controls 30, 30′ are provided at the inputs of the integrator 31 and amplifier 32 so that the relative levels of the outputs thereof can be adjusted. The gain controls could be placed at the outputs, but the positions shown enable operation of 31, 32 at a nearly fixed level. By switching the selector switch and watching indicator lights to be described later, the input levels can be adjusted until the signals representing $i^2$ and $e^2$ are equal and of the desired value. Then selector switch 33 can be moved to the power position for monitoring the welding operation.

The output of squaring circuit 35 is supplied to an integrating circuit 36 which develops signals as described in connection wtih FIG. 4. The integrated output is supplied to level detectors 37, 38, 39, along with suitable reference signals to determine when the integrated signal exceeds the level in one or more detectors. It is particularly contemplated that the reference levels for detectors 37–39 will be in ascending order. The outputs of the level detectors are supplied to trigger circuits here shown as so-called "single kick" multivibrators 41, 42, 43, respectivly. The outputs of 41 and 43 are supplied to a multivibrator 44 and the latter is connected through a switch 45 to a red light. Multivibrator 44 causes the red light to flash. The output of 42 is supplied through a switch 46 to a green light.

The output of 43 is also supplied through line 47 to the lower order stages 42 and 41 so as to reset them. Similarly, the output of 42 is supplied through line 48 to 41 to reset the latter. Thus, when a higher order single kick multivibrator is actuated, the lower order ones are deactuated.

The outputs of all the single kick multivibrators are supplied to a reset circuit 49 and the latter is connected back to the multivibrators through line 51 to reset all multivibrators after a given weld has been made. The detailed circuitry involved in performing these operations will be given in connection with FIGS. 6–8.

Figure 8:
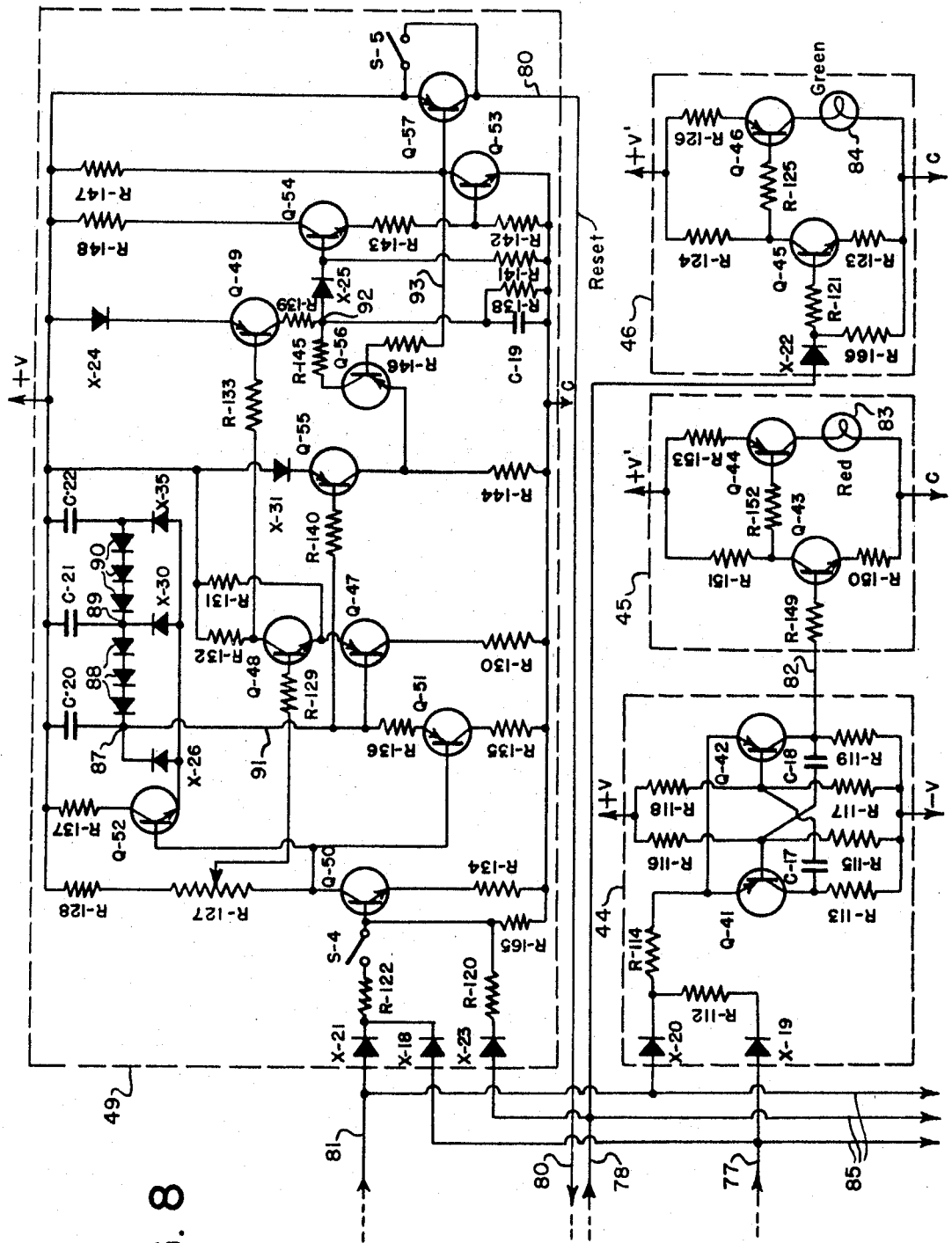

In FIGS. 6–8 resistors are designated R, capacitors C, transistors Q, and diodes X, each followed by an appropriate numeral. Transistors of both PNP and NPN types are employed. When the emitter arrow points toward the base a PNP type is indicated, and when it points away from the base an NPN type is indicated. As will be understood by those skilled in the art, the types may be interchanged with suitable change in the polarity of the power supply, etc. To avoid excess lines in the drawings, the sources of power have been shown separately for many stages. Thus, +V denotes a positive supply from a battery or regulated power supply, −V designates a suitable negative power supply, and C designates the common lead which may be ground.

Many individual transistor stages are conventional per se, and detailed explanation thereof is unnecessary. Thus in some cases only the overall function performed by an individual stage will be mentioned, since the detailed functioning of the components associated therewith will be understood by those skilled in the art.

Referring to FIG. 6, block 31 is an operational integrator for integrating the differential output of the toroid coil to obtain a current signal. Input lines 54, 54′ are the leads from toroid 15 of FIG. 1. A voltage divider composed of potentiometers R156 and R155 is provided so that a selectable portion of the toroid signal may be supplied through R2 to Q1.

Transistors Q1–Q5 are connected as an operational amplifier with feedback through C1 to form, with R2, an integrator. The design may follow conventional practice and hence will be described only briefly. Q1 functions essentially as an emitter follower (small R3) so as to provide a high input impedance. The emitter is connected to Q2 which functions as a grounded emitter type amplifier (small R5), hence giving considerable gain. Q3 matches the high impedance at the collector of Q2 to the low input impedance of Q4. Q4 functions as a grounded base stage with base bias supplied through R8 and R9. The collector of Q4 is connected to the base of Q5, the latter functioning as a grounded collector stage (low R12). C4 provides a high frequency roll-off to promote stability. Due to the integration, the signal at point 55 represents the current flowing through the weld (FIG. 1). This signal is supplied through C23 to the top of series resistors R21, R20 having a three-position selector switch S1 associated therewith.

The voltage pickup across the electrodes of FIG. 1 is supplied through leads 14, 14′ to an attenuator including potentiometer R157 and resistor R158. To increase the range of adjustment, a step attenuator is also provided composed of R159–R161 and switch S2. If conditions require, a similar step attenuator may be inserted at the input of the integrator 31.

The output of the attenuator is fed to Q6. Transistors Q6–Q8 form an amplifier indicated by block 32 which is primarily for impedance matching purposes. Q6 and Q7 are connected as a comparator amplifier and the collector output of Q6 is supplied to Q8 which functions as a grounded emitter amplifier. Diode X1 provides a suitable bias for the emitter of Q8. The collector of Q8 is tied to the base of Q7, causing essentially 100% feedback. In consequence, the input impedance of Q6 is high and the output impedance at point 56 is considerably lower due to the current gain in Q6 and Q8. Due to the large feedback, the voltage signal at point 56 is essentially the same as that at the input of Q6. The signal at point 56, representing the voltage across the welder electrodes, is supplied through C6 to the series resistors R19, R18 associated with switch S1A.

By adjusting the input voltage dividers the signals at points 55 and 56, representing current and voltage, respectively, may be made equal and of desired amplitude. Switches S1 and S1A are ganged, and in their upper positions only the current signal is supplied to Q9. In their lower positions only the voltage signal is supplied. In the midpositions shown, both current and voltage signals are supplied to Q9, and the added R20 in series with R21, and R18 in series with R19, reduces the amplitude of the two signal components to one-half their values at the upper and lower positions.

Transistors Q9–Q13 function as an operational amplifier with feedback through R26 to the input, thereby providing a summing amplifier. The amplifier is very similar to the integrating amplifier 31, except for the feedback loop, and need not be described again. Capacitor C7 provides high frequency roll-off for stability.

The feedback signal through R26 is supplied to the base of Q9, along with the input signal. Both the feedback voltage and the signal gain of the amplifier are determined by the values of R26 and the resistors chosen by switches S1, 1A. These are selected so that the signal at point 61 represents $v_i$, $\frac{1}{2}v_i + \frac{1}{2}v_e$, or $v_e$, depending upon the setting of switches S1, 1A.

The resulting signal at point 61 is fed through C9 to the input of the squaring circuit generally designated by block 35. Q14 and Q15 are connected as a comparator, with a common emitter resistor R34. The collector of Q14 is connected to the base of Q16 which functions as a grounded emitter amplifier with emitter bias provided by diode X2. The collector load R36 is shunted by C10 to decrease the high frequency response. The collector of Q16 is connected to the base of Q17 functioning as an emitter follower (small R39). The emitter of Q17 is connected through feedback resistor R37 to the base of Q15. Since Q15 and Q14 form a comparator amplifier, the overall operation of the circuit is to maintain the base of Q15 substantially equal in potential to the input signal at the base of Q14.

The base of Q15 is also connected through line 62 to a diode function generator. It will be noted that R37 and the resistance from line 62 to C (ground) form a voltage divider which determines the fraction of the voltage at the emitter of Q17 which is fed back to the base of Q15.

Diodes X3–X6 and X36 are so biased that they conduct successively at successively higher potentials of line 62. Bias for the diodes is supplied through line 64 and Q18 from +V. The base of Q18 is connected to a voltage divider including potentiometers R50 and R49. By adjusting the slider of R50, the conductance of Q18 can be varied and thus the potential of line 64. R48 is a bleeder to supply a constant load on Q18 and C11 is a bypass capacitor to reduce noise in the voltage supply.

At this point it is convenient to introduce specific voltage values, it being understood that these are for illustration only and that they may be departed from as meets the requirements of a given application. Diode X3 is biased through R40 and R41 to approximately 0.9 volt and it requires at least a 0.1 volt drop across X3 before any appreciable forward conduction takes place. Thus, for voltages in line 62 up to 1 volt, diode X3 is nonconducting. Therefore the potential at the base of Q15 is the same as at point 63, and the voltage output in line 65 is the same as the voltage input to the base of Q14.

Figure 9:
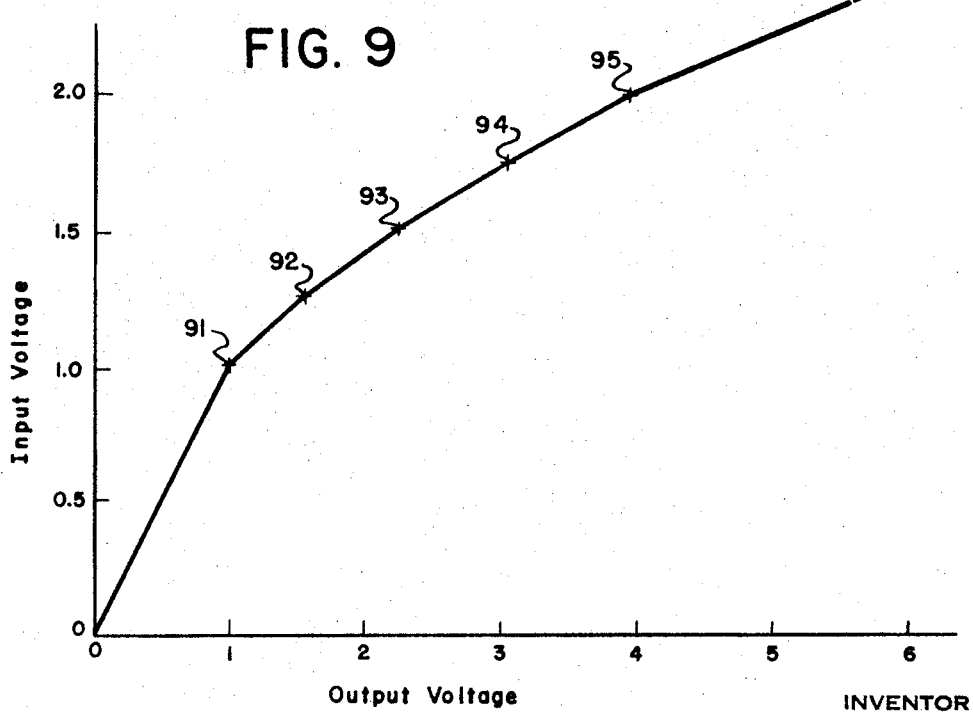
FIG. 9 is illustrative of the operation of the squaring circuit employed in FIG. 6.

This corresponds to the portion of the curve of FIG. 9 from the origin up to point 91. In this region there is no squaring action. As above mentioned, the input attenuators are adjusted to yield equal current and voltage signals for mean welding conditions in a given setup. Since the computer need only operate in a relatively small region around the mean value, the attenuators may also be adjusted to set the signal level applied to the computer at any convenient value. In this particular embodiment an initial output voltage level of four volts is selected for the squaring circuit. Hence, it becomes unimportant to square any of the signal waveforms below one volt since the contribution both to the peak computation of the power waveform and to the short time integrated power waveform is negligible. This is seen from FIG. 3c where dotted lines 60, 60' indicate the effect of failure to square at low signal levels.

As the signal level at the emitter of Q17 goes above 1 volt, X3 begins to conduct and causes a potential drop across R37 so that there is no longer a 1:1 relationship between the input of Q14 and the output at point 63. This is the region between 91 and 92 in FIG. 9. Diode X4 is biased so that it begins to conduct at 92 and successive diodes begin their conduction at point 93 for X5, point 94 for X6 and point 95 for X36. As the diodes conduct in succession, the impedance from line 62 to ground is reduced, thereby further changing the ratio between the input of Q14 and the output at point 63. The reduction in impedance is selected to yield the desired squaring action. Point 93 corresponds to an input voltage at 1.5 volts and an output voltage of 2.25 volts, and point 95 corresponds to an input of 2.0 volts and an output of four volts. Points 92 and 94 are convenient intermediate points. Thus, it will be seen that a square law relationship exists between the input and output voltages of the squaring circuit 35. In FIG. 9 successive points are joined by straight lines. Actually, since the diode conductances are somewhat nonlinear, smoothing occurs so that the change in slope at the points of FIG. 9 are gradual instead of abrupt.

The design of squaring circuits is well known in the art and further description is believed unnecessary.

Referring now to FIG. 7, the squared signal in line 65 of FIG. 6 is supplied to an integrating circuit denoted generally by block 36. This signal is fed to the base of Q19 and also to a group of resistors R52–R56 and through switch S2 to one of capacitors C12, C13, the integrated signal appearing in line 67. Various combinations of the resistors and capacitors are selectable by S2, so as to provide different integrating time constants. Inasmuch as D-C welders do not have a fixed pulse length (see FIG. 2) it is desirable to be able to adjust the integrating time constant to provide a time base which is sufficiently close to the time base of the waveform involved so that a useful effective power will be determined. The various time constants here provided serve this purpose, and additional resistors and capacitors may be provided to give an additional choice of time constants if desired.

As before stated, it has been found desirable to terminate the integration when the instantaneous voltage on the trailing edge of the waveform becomes equal to the integrated signal. Transistors Q19 and Q20 accomplish this. Q20 has its emitter-collector circuit connected directly across whichever capacitor is selected, and serves as a discharge circuit therefor. Q19 serves for control. Q19 and Q20 are of opposite polarity types and advantageously are complementary. Q19 functions as an emitter-follower. During the leading portions of an applied waveform such as shown at 23 in FIG. 3, the base of Q19 will be positive to the emitter and conduction will occur so that the potential of line 66 is substantially that of input line 65. Assuming that S2 is in the position shown, during this portion of the waveform C13 will be charging through R53 and there will be a voltage drop across R53. Consequently the emitter of Q20 will be negative to its base and Q20 will be cut off.

During the trailing edge of pulse 23 the voltage in line 65 is decreasing, and the potential of the base and emitter of Q19 will decrease. At some point during the trailing portion, the potential of line 65 and therefore 66 will go below the potential across C13 (that of line 67) and Q20 will become conductive. Thus, discharge of C13 will begin. The current necessary to operate Q20 is supplied through R51. During the discharge, the negative bias supplied through R51 to the base of Q20 insures that the transistor will be highly conductive even though the voltage across C13 approaches zero. Q20, R51 and the negative supply −V are selected so that Q20 is capable of discharging C13 at a rate at least equal to the maximum rate of change of an applied waveform in line 65, and preferably considerably greater. The discharge of C13 through Q20 continues as the applied signal in line 65 decreases and, when the applied signal reaches zero, C13 will be completely discharged.

The discharge circuit shown is similar to that described in copending application Ser. No. 262,565, filed Mar. 4, 1963, by Hugo S. Ferguson for "Electric Meters." A detailed analysis is there given and may be referred to if desired. The explanation given above suffices for present purposes.

The integrated signal in line 67 is applied to the input of Q21. Q21 and Q22 form a comparator similar to Q14 and Q15 in FIG. 6. Q23 amplifies the output of Q21 and feeds it back through R154 to the base of Q22. This is similar to the action of Q16 and R34 in FIG. 6, the emitter follower Q17 being omitted. Resistor R60 replaces the diode function generator. Accordingly, the detailed operation need not be described further. Overall, the potential at the base of Q22 is maintained equal to that at the base of Q21. The collector potential of Q23 in line 68 will be somewhat higher than that at the base of Q22 so that some amplification is obtained. The output signal is supplied through lines 68, 69 to the level detectors indicated by blocks 37, 38 and 39.

Level detector 37 is a fixed level detector in which the emitter of Q24 is supplied with a small bias by diode X8. The potential provided by X8 and the diode drop of the base to emitter junction of Q24 may be, say, 0.6 volt. Consequently whenever the signal in line 68 exceeds that value, Q24 will conduct and deliver a negative-going signal through R63 to a latching single kick multivibrator in block 41. Description of the latter will be deferred.

Referring for the moment to FIG. 7a, an illustrative integrated signal 71 is shown, such as would occur in line 68. The integrated signal first rises steeply corresponding, for example, to the integration of the leading edge of pulse 23 in FIG. 3. As the peak of the pulse is passed, the integration proceeds more slowly until point 72 is reached, at which point the integrating capacitor in block 36 is discharged. The level at which Q24 conducts is shown at 73. As will be explained further hereinafter, the voltage level of point 72 is initially set at a fixed value by adjustment of the input potentiometers of FIG. 6. While limit levels 74 and 75 could be set independently, in this embodiment the levels are controlled so that they simultaneously move closer to the level of point 72, or farther apart in accordance with desired tolerance limits.

Referring back to FIG. 7, level detectors 38 and 39 each include a pair of transistors Q25, Q26 and Q27, Q28 connected as comparators. The integrated signal in line 69 is supplied to the bases of Q25 and Q27 in respective detectors. The bases of Q26 and Q28 are connected through ganged switches S3 and S3A to similar voltage dividers composed of resistors R80, R80A, R79, R79A, . . . R77, R77A. The lower ends of the resistor chains are connected together by lead 76. A regulated voltage is established across the upper ends of the resistor chains by a Zener diode Z1, in conjunction with R71 leading to the +V supply. R80 is made adjustable for calibration purposes.

With the arms of S3 and S3A in their lower position, they will be connected by lead 76 and consequently the reference signal levels supplied through R68 to Q26 and through R76 to Q28 will be the same and will correspond to point 72 in FIG. 7a. Actually, under this condition, there would be a zero tolerance which is not very useful. Consequently, the lower switch position may be omitted but is included here for convenience of explanation.

As the arms of switches S3 S3A move upwards simultaneously, the reference level for Q26 decreases and that for Q28 increases. Thus, as the arms move upwards a larger and larger tolerance is obtained, corresponding to an opening out of levels 74 and 75 in FIG. 7a with respect to the level of point 72.

The output of level detector 38 is supplied through blocking diode X37 to the base of Q32 in block 42. Similarly, the output of level detector 39 is supplied through blocking diode X38 to the base of Q36 in block 43.

Returning now to block 41, a latching single kick multivibrator of conventional type is provided including Q29, Q30 and the interconnecting resistors. If level detector 37 has not been actuated, the potential supplied to the base of Q29 through R63 will be nearly +V, and Q29 will be nonconducting. The base and emitter of Q30 are returned to —V so that Q30 also will be nonconducting. When Q24 in the level detector conducts, the base of Q29 will be driven in a negative direction, causing Q29 conduct. This provides a positive potential at the collector of Q29 and therefore at the base of Q30, causing Q30 to conduct. The two transistors are interlocked by R86 and R85, causing the multivibrator to lock up when actuated. The collector of Q30 will supply a negative potential to the base of Q31 functioning as an electronic switch, causing the latter to conduct and deliver a large positive signal to the output line 77. This will cause a red light to flash as will be described in connection with FIG. 8.

Block 42 is similar to 41. When an input thereto is supplied through X37, electronic switch Q35 conducts and delivers a large positive signal to the output line 78 which will turn on a green light, as will be explained. Block 42 contains an additional transistor stage Q34 which conducts when Q35 conducts. When Q34 is turned on, it supplies a large positive voltage through line 79 to the base of Q29 in block 41, thereby driving Q29 to its original condition and removing the large positive signal from the output line 77. Thus, when the input signal exceeds the level 74 in FIG. 7a, the level signal due to exceeding level 73 will be discontinued.

Block 43 is similar to 42 and delivers a large positive signal in output line 81 whenever a signal is delivered thereto through X38 above the maximum tolerance level 75. Q39 resets the multivibrator in block 41 by delivering a large positive signal through line 82 to line 79. Similarly, Q38 delivers a large positive signal through line 83 to the input of Q32 in block 42, thereby removing the positive signal in the corresponding output line 78.

Line 80 is provided in order to reset all three single kick multivibrators. This is connected through blocking diodes X9, X11 and X14 to the input stages of blocks 41, 42 and 43. When a large positive signal is applied to line 80, any multivibrator which has been actuated is reset to its initial condition.

Referring now to FIG. 8, the output of the lowest level detector switch in line 77 is supplied through blocking diode X19 and R112, R114 to the emitters of Q41 and Q42. These transistors operate as a conventional Eccles-Jordan multivibrator which need not be described in detail. Since R112 and R114 are in series with the positive voltage supplied from Q31 (FIG. 7) to Q41, Q42, they participate in controlling the frequency of the multivibrator. With a positive signal in line 77, a low output frequency of approximately 1 c.p.s. has been employed. The output of the multivibrator in line 82 is supplied through R149 to an electronic switch circuit in block 45. Q43 operates as a small signal amplifier and drives Q44, which is a high current amplifier for direct operation of a read-out red signal lamp 83, and causes the lamp to flash. Overall, when the integrated signal exceeds the low level 73 in FIG. 7a, a slowly flashing red signal is produced.

When the signal exceeds the minimum tolerance level 74 in FIG. 7a, the large positive signal in output line 78 of FIG. 7 is applied to a switch circuit shown in block 46 of FIG. 8. This is similar to block 45, the signal being applied through blocking diode X22 and R121 to the base of Q45. Consequently, when the integrated signal exceeds the minimum level 74 of FIG. 7a, a steady green light from lamp 84 is obtained. Due to the resetting of the lower level multivibrator as described above, the red light is turned off.

The output of the maximum tolerance level indicator in line 81 of FIG. 7 is supplied through diode X20 in FIG. 8 to the junction of R112 and R114. This causes the multivibrator Q41, Q42 and switch 45 to actuate the red lamp 83. However, only resistor R114 is now in series with the emitter-collector circuits of Q41 and Q42 so that a higher frequency of operation, say 4 c.p.s., is obtained. This enables distinguishing below tolerance from above tolerance levels. As mentioned before, when the integrated signal exceeds the upper level 75 of FIG. 7a, the multivibrators in the lower level detectors are reset, so that green light 84 goes out and only the rapidly flashing red light is visible. Output lines 85 are connected to lines 77, 78 and 81 for control or other desired purposes.

The upper block 49 of FIG. 8 is a resetting circuit to facilitate production line use. Three types of resetting are provided for, namely, manual, semiautomatic and automatic. Manual resetting is obtained by closing switch S5, thereby applying +V to line 80 which resets the single kick multivibrators in blocks 41, 42 and 43 of FIG. 7.

The semiautomatic operation provides reset only when a green light is obtained indicating that the weld was satisfactory. To this end, line 78 is connected through blocking diode X23 and R120 to the base of Q50 which actuates the resetting circuit. For fully automatic operation, switch S4 is closed. Then, below-tolerance and above-tolerance signals in lines 77 and 81 are applied through respective blocking diodes X18, X21 and R122 to the base of Q50. Thus the automatic resetting operates regardless of whether a fast or slow flashing red light, or a green light, is obtained.

A considerable variation in reset time may be required in practice. The reset circuit in block 49 is capable of providing a reset time which is adjustable from a very short time of, say, 0.1 second, to an indefinitely long time. However, the longest time ordinarily required is of the order of several minutes.

The duration of the reset time is obtained by control of the charging and discharging of capacitors C20, C21 and C22. Capacitor C20 is charged negatively through a resistance in a manner to be described. When the potential at point 87 is reduced sufficiently below +V, the diodes 88 conduct, thereby allowing C21 to start charging negatively. The series resistance remains substantially constant, so that the charging rate of C20 and C21 in parallel will be slower than that of C20 alone. When the potential at point 89 becomes sufficiently negative to +V, diodes 90 will conduct, thereby allowing C22 to begin charging. This yields a still lower charging rate. At the end of the reset interval, the capacitors are discharged, ready for a new cycle.

In the absence of a signal on its base, Q50 will be cut off. Its collector, and the bases of Q51 and Q52 connected thereto, will be near +V. Q51 will accordingly be cut off, but Q52 will be conducting if there is any charge to be removed from C20–C22. Q47 and Q48 will be cut off.

When a positive level signal is applied to Q50, it becomes highly conductive, bringing its collector close to ground C, Q52 will be cut off and there will be a large voltage drop across R127, R128. Q51 will now conduct strongly and C20 will start charging through R136 and R135, the latter being of low value. As C20 charges, and subsequently C21 and C22, the potential of line 91 drops. Therefore Q47 will start to conduct.

The potential of the emitter of Q48 is determined by the voltage divider R131, the impedance of Q47, and R130 from +V to C. Its base potential is determined by the setting of R127. As the potential of line 91 drops, a point will be reached where the impedance of Q47 is sufficiently low so that the emitter of Q48 goes negative to its base, and Q48 starts to conduct. The collector of Q48 is connected through R133 to the base of Q49, and the emitter of Q49 is connected to +V through biasing diode X24. Consequently, as current increases through R132 in the collector circuit of Q48, Q49 starts to conduct and charge C19 through R138. C19 functions to provide a holdover after resetting has taken place, as will be described later.

With Q49 conducting, current will flow through X25 and R141, thus increasing the potential on the base of Q54 and starting conduction therein. Q54 is connected as an emitter follower (small R148), and drives Q53 to start conduction therein. The collector of Q53 is connected to the base of the switch transistor Q57 and causes Q57 to conduct, thereby initiating a reset signal in line 80.

It is desirable to make the switching action positive and abrupt. Accordingly the collector of Q53 is connected through R146 to the base of Q56. The emitter of Q56 is connected to the collector of Q55. The base of Q55 is connected through R140 to line 91, and the emitter to +V through X31. Consequently at this time Q55 will be conducting, and the emitter of Q56 will be positive to the base thereof causing Q56 to conduct. Accordingly the charging current to C19 will be increased by current through Q55, Q56 and R145 to point 92. The increased potential of point 92 will increase current flow to the base of Q54, thus hastening the switching action of Q57.

When Q57 switches, the positive signal in line 80 resets any actuated single-kick multivibrator in blocks 41–43 of FIG. 7, thereby removing the positive signal on the base of Q50 and returning Q50 to its initial cutoff state. This turns on Q52 and C20–22 are rapidly discharged through blocking diodes X26, X30 and X35. Q51, Q47, Q48, Q49, Q55 and Q56 will also be cut off. This stops charging of C19, and it discharges through R138 and the parallel circuit X25, R141. During the discharge sufficient current is supplied to the base of Q54 to maintain its conduction for a short time, and consequently conduction in Q53 and Q57. This holdover of the actuation of switch transistor Q57 allows any transients to decay and prevents a feedback race from developing, thereby insuring reliable resetting.

In operation, the monitor may be initially adjusted under conditions known to yield a satisfactory weld. Preferably the initial conditions represent an approximate mean of the range of conditions yielding a satisfactory weld. For example, a so-called Isostrength diagram known in the welding art may be developed, in which various electrode forces and effective energies are employed and the pull-strength of the resultant welds determined. The monitor may be used in the development of the diagram. This will yield a range of energy conditions within which operation is satisfactory, and the mean conditions and tolerance range can be determined therefrom.

The integration time constant selectable by switch S2 may be set to correspond to the length of the power pulse corresponding to mean welding conditions, or as experience dictates is suitable for a particular welding setup.

With mean conditions existing, the input attenuators R156, R157 and S2 are set to produce equal current and voltage waveforms at a desired fixed level in the instrument. This may be accomplished by setting the switch S3, 3A for a small tolerance, say 1%, setting switch S1, 1A to current squared and voltage squared conditions alternatively, and adjusting respective input attenuators until a green light indication is obtained for both settings of S1, 1A. Then S1, 1A may be placed in its central power position. If a green light is not obtained, for example, due to a small phase angle or differences in wave shape of the two signals, one or the other attenuator may be readjusted slightly until a green light is obtained. Then switch S3, 3A may be moved to the desired tolerance range.

Thereafter, during production welding, a green light will indicate that the effective weld power is within tolerance, and a flashing red light will indicate outside of tolerance. If the red light flashes slowly, the effective power is below tolerance. If it flashes more rapidly, the power is above tolerance.

As an aid to the ready practice of the invention, and not by way of limitation, the following component values are given which have been found satisfactory in one particular monitor.

| Capacitors: | Mfd. |
| --- | --- |
| C12 | 0.01 |
| C1 | 0.047 |
| C5, 10, 14 | 0.1 |
| C13 | 1.0 |
| C9, 15–18, 20 | 10 |
| C2, 6, 11, 19, 21 | 140 |
| C22 | 280 |
| C3, 4, 7, 8 | 470 |

Resistors: Ohms
- R126 — 4.7
- R12, 31, 39, 153 — 47
- R3, 15, 23, 35, 59, 75, 123, 130, 134, 135, 137, 148, 150, 155, 158, 159 — 100
- R114, 125, 152 — 220
- R5, 24 — 470
- R71 — 560
- R70, 160 — 900
- R54, 56, 68, 76, 83, 87, 92, 96, 102, 106, 128, 139, 145, 154, 156, 157 — 1K
- R18–21, 60 — 2K
- R11, 16, 17, 30, 38, 48, 49, 63, 69, 77, 112, 124, 129, 142, 143, 147, 151 — 2.2K
- R50, 80 — 2.5K
- R53 — 4.16K
- R1, 8, 22, 28, 81, 113, 119, 132, 133, 141, 146, 149 — 4.7K
- R37, 55 — 5K
- R116, 118 — 8.2K
- R161 — 9K
- R7, 9, 14, 27, 29, 32, 33, 52, 57, 61, 62, 64, 66, 72, 74, 82, 85 86 88–91 94 95, 97–101, 104, 105, 107–111, 120–122, 127, 131, 138, 140, 144 — 10K
- R4, 6, 13, 25, 34, 36, 51, 58, 65, 73, 84, 93, 103, 115, 117, 136 — 22K
- R10, 26 — 47K
- R2 — 75K
- R67 — 100K Diodes:
- X3, 4, 5, 6, 9, 10, 11, 12, 13, 14, 15, 16, 17, 18, 19, 20, 21, 22, 23, 26, 30, 35 — 1N281
- X1, 2, 7, 8, 24, 25, 27, 28, 29, 31, 32, 33, 34 — 1N461
- Z1 — 1M7.5

Transistors:
- Q1, 9 — 2N929
- Q44, 46 — 2N1183
- Q2, Q4–7, 10, 12–15, 17–19, 21, 22, 24–28, 30, 33, 34, 37, 43, 45, 48, 50, 52–54 — 2N1304
- Q3, 8, 11, 16, 20, 23, 29, 31, 32, 35, 36, 38–42, 47, 49, 51, 55–57 — 2N1305

The invention has been described in connection with a specific embodiment thereof. It will be understood by those skilled in the art that many changes may be made in the specific circuits employed, and that selected features of the invention may be employed and others omitted as meets the requirements of a particular application.

Although the power monitor of the invention is specifically designed for monitoring D-C welders of the stored-energy type, wherein both voltage and current may be expected to vary considerably, it may also be employed to monitor other types of welders such as single-phase or three-phase A-C welders. Further, it may be useful in monitoring short bursts of power in other applications.

I claim:

1. A power monitor which comprises
    (a) input circuits for receiving signals representing current and voltage, respectively, and yielding output signals proportional to current and voltage,
    (b) a summing circuit for adding current and voltage signals received from said input circuits,
    (c) means for initially adjusting the amplitudes of the current and voltage signals to substantial equality as applied to said summing circuit,
    (d) a squaring circuit for squaring the output of said summing circuit to obtain a power signal,
    (e) and means for detecting changes in the output of said squaring circuit from the output corresponding to the initial values of the current and voltage signals applied to said summing circuit.

2. A power monitor in accordance with claim 1 including switch means between said input and summing circuits for alternatively supplying to the summing circuit substantially only the adjusted current signal, or substantially only the adjusted voltage signal, or substantially one-half of each of said adjusted current and voltage signals.

3. A power monitor for monitoring the power of resistance welders and the like, which comprises
    (a) input circuits for receiving signals representing current and voltage, respectively, and yielding output signals proportional to current and voltage,
    (b) a summing circuit for adding current and voltage signals received from said input circuits,
    (c) means for initially adjusting the amplitudes of the current and voltage signals to substantial equality as applied to said summing circuit,
    (d) a squaring circuit for squaring the output of said summing circuit,
    (e) an integrating circuit for receiving the output of said squaring circuit and produce an integrated signal therefrom,
    (f) an indicating means responsive to said integrated signal.

4. A power monitor in accordance with claim 3 including means for terminating the integration of said integrating circuit when the integrated signal produced thereby substantially equals the instantaneous value of the trailing edge of the signal applied thereto.

5. A power monitor is accordance with claim 4 including means for providing a plurality of selectable integrating time constants in said integrating circuit.

6. A power monitor in accordance with claim 3 including switch means between said input and summing circuits for alternatively supplying to the summing circuit substantially only the adjusted current signal, or substantially only the adjusted voltage signal, or substantially one-half of each of said adjusted current and voltage signals.

7. A power monitor for monitoring the power of resistance welders and the like, which comprises
    (a) input circuits for receiving signals representing current and voltage, respectively, and yielding output signals proportional to current and voltage,
    (b) a summing circuit for adding current and voltage signals received from said input circuits,
    (c) means for initially adjusting the amplitudes of the current and voltage signals to substantial equality as applied to said summing circuit,
    (d) switch means between said input and summing circuits for alternatively supplying to the summing circuit substantially only the adjusted current signal, or substantially only the adjusted voltage signal, or substantially one-half of each of said adjusted current and voltage signals,
    (e) a squaring circuit for squaring the output of said summing circuit,
    (f) an integrating circuit for receiving the output of said squaring circuit and produce an integrated signal therefrom,
    (g) said integrating circuit having a plurality of selectable integrating time constants,
    (h) means for terminating the integration of said integrating circuit when the integrated signal produced thereby substantially equals the instantaneous value of the trailing edge of the signal applied thereto,
    (i) and indicating means responsive to said integrated signal.

8. A power monitor in accordance with claim 7 in which said indicating means includes a plurality of level detectors for determining when the terminal value of said integrated signal exceeds respective predetermined levels.

9. A power monitor in accordance with claim 7 in which said indicating means includes at least two level detectors adjustable in opposite directions from predetermined levels approximately equal to the terminal value of said integrated signal applied thereto with the initially adjusted current and voltage signals applied to said summing circuit.

10. A power monitor in accordance with claim 9 including a plurality of latching switch circuits responsive to said level detectors respectively and providing respective indications, means responsive to the actuation of a higher level detector for resetting the latching switch circuit of a lower level detector, and a reset circuit responsive to the actuation of at least one of said level detectors for resetting any actuated latching switch circuit after a predetermined delay time.

References Cited

UNITED STATES PATENTS

| | | | |
|---|---|---|---|
| 1,919,978 | 7/1933 | Dempster | 219—109 |
| 1,938,499 | 12/1933 | Ragsdale | 219—109 |
| 2,748,380 | 5/1956 | Platte et al. | 219—109 XR |
| 2,900,137 | 8/1959 | Giser | 235—194 |
| 2,906,459 | 9/1959 | Lovell | 235—194 |
| 3,034,057 | 5/1962 | Ferguson | 219—109 XR |
| 3,127,595 | 3/1964 | Coyne | 219—109 XR |
| 3,191,017 | 6/1965 | Miura et al. | 235—194 |
| 3,194,939 | 7/1965 | Hill | 219—109 |
| 3,247,501 | 4/1966 | Riley et al. | 219—109 XR |
| 3,267,375 | 8/1966 | Olsen | 324—99 XR |

RUDOLPH V. ROLINEC, *Primary Examiner.*

E. F. KARLSEN, *Assistant Examiner.*

U.S. Cl. X.R.

219—109; 253—194